(12) United States Patent
Crosbie (10) Patent No.: US 6,878,651 B2
(45) Date of Patent: Apr. 12, 2005

(54) GLASS COMPOSITIONS FOR CERAMIC ELECTROLYTE ELECTROCHEMICAL CONVERSION DEVICES

(75) Inventor: Gary Mark Crosbie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 227 days.

(21) Appl. No.: 09/728,343

(22) Filed: Dec. 1, 2000

(65) Prior Publication Data

US 2002/0068677 A1 Jun. 6, 2002

(51) Int. Cl.$^7$ ............................................. C03C 10/04
(52) U.S. Cl. ........................... 501/5; 501/15; 501/17; 501/21; 501/32; 501/72
(58) Field of Search ...................... 501/5, 15, 17, 501/21, 32, 72

(56) References Cited

U.S. PATENT DOCUMENTS

| | | | |
|---|---|---|---|
| 3,022,179 A | * | 2/1962 | Morrissey ............... 501/153 |
| 3,489,627 A | * | 1/1970 | Botden et al. ........... 156/89.28 |
| 3,501,322 A | * | 3/1970 | Dumbaugh et al. ........ 257/705 |
| 3,839,055 A | * | 10/1974 | Grossman ............. 106/DIG. 3 |
| 3,935,017 A | | 1/1976 | Gardner |
| 4,687,749 A | * | 8/1987 | Beall ............................. 501/4 |
| 4,746,578 A | * | 5/1988 | Kondo et al. ................ 428/432 |
| 4,806,334 A | * | 2/1989 | Fujinaka et al. ............ 174/256 |
| 4,827,606 A | | 5/1989 | Szreders et al. |
| 4,935,387 A | * | 6/1990 | Beall et al. ................. 428/698 |
| 4,948,758 A | | 8/1990 | Becall et al. |
| 4,949,010 A | | 8/1990 | Petersen et al. |
| 5,091,345 A | | 2/1992 | Becker |
| 5,284,807 A | | 2/1994 | Komori et al. |
| 5,501,914 A | | 3/1996 | Satake et al. |
| 5,525,855 A | | 6/1996 | Gotoh et al. |
| 5,827,620 A | | 10/1998 | Kendall |
| 6,099,985 A | | 8/2000 | Elangovan et al. |
| 6,271,158 B1 | | 8/2001 | Xue et al. |
| 6,291,092 B1 | | 9/2001 | Kohli et al. |
| 6,296,963 B1 | | 10/2001 | Nanjo |
| 6,430,966 B1 | | 8/2002 | Meinhardt et al. |
| 6,532,769 B1 | | 3/2003 | Meinhardt et al. |

FOREIGN PATENT DOCUMENTS

| | | |
|---|---|---|
| EP | 0982274 A2 | 7/1999 |
| EP | 1008563 A1 | 12/1999 |
| EP | 1010675 A1 | 12/1999 |
| EP | 1008563 A * | 6/2000 |
| EP | 1010675 A * | 6/2000 |
| JP | 50008442 | 4/1975 |
| WO | WO 98/46540 | 10/1998 |

OTHER PUBLICATIONS

Aluminosilicate Glass Ceramics as Sealant in Sofc Stacks; by: N. Lahl, L. Singheiser, and K. Hilpert; Institute for Materials and Processes in Energy Technology, Research Center Jülich 52424 Jülich, Germany; Electrochemical Society Proceedings vol. 99–10; pp. 1057–1066, No Date Available.

(Continued)

Primary Examiner—David Sample
(74) Attorney, Agent, or Firm—Brooks Kushman P.C.; Damian Porcari (57) ABSTRACT

A glass composition consisting essentially by mol percent of about $55<SiO_2<75$; $5<BaO<30$; and $2<MgO<22$ for use as a matrix of composite materials. A method of making a glass matrix-ceramic particulate composition useful for sealing electrochemical structures, such as solid oxide fuel cells is also disclosed. Method steps include the admixture of finely divided $Mg_2SiO_4$ particulates with the matrix glass, to reach an overall composition by mol percent of about $55<SiO_2<65$; $5<BaO<15$; and $25<MgO<35$.

5 Claims, 5 Drawing Sheets

OTHER PUBLICATIONS

Glass–Ceramic Sealants for Solid Oxide Fuel Cells: Part I. Physical Properties; by K.L. Ley, M. Krumpelt, R. Kumar, J.H. Meiser, and I. Bloom; Electrochemicial Technology Program, Chemical Technology Division, Agronne National Laboratory, Argonne, Illinois; J. Mater, Res. vol. 11, No. 6, Jun. 1996;; pp. 1489–1493.

The American Ceramic Society, Annual Meeting Abstracts, $102^{nd}$ Annual Meeting & Exposition Apr. 30–May 3, 2000, St. Louis, MO, "Processing Methods for Ceramic Joining", 1 pp.

* cited by examiner

| | SiO2 mol.% | BaO mol.% | MgO mol.% | SiO2 wt.% | BaO wt.% | MgO wt.% | O at.% | Si at.% | Ba at.% | Mg at.% |
|---|---|---|---|---|---|---|---|---|---|---|
| text range | [55,75] | [5,30] | [2,22] | | | | | | | |
| Vertex# | | | | | | | | | | |
| 1 | 75 | 23 | 2 | 55.54 | 43.467 | 0.9935 | 63.636 | 27.273 | 8.3636 | 0.7273 |
| 2 | 75 | ~~5~~ 11 | ~~20~~ 14 | ~~74.128~~ | ~~12.617~~ | ~~13.26~~ | ~~66.036~~ | ~~27.273~~ | ~~1.8182~~ | ~~1.8727~~ |
| 3 | 73 | ~~5~~ 11 | ~~22~~ 14 | ~~72.027~~ | ~~12.695~~ | ~~14.661~~ | ~~62.57~~ | ~~26.74~~ | ~~1.8315~~ | ~~8.8586~~ |
| 4 | ~~56~~ 56 | ~~22~~ 30 | ~~22~~ 14 | ~~42.617~~ | ~~45.695~~ | ~~11.488~~ | ~~60.784~~ | ~~21.569~~ | ~~9.0496~~ | ~~8.6275~~ |
| 5 | ~~56~~ 56 | 30 | ~~16~~ 14 | ~~38.925~~ | ~~54.88~~ | ~~7.1047~~ | ~~60.784~~ | ~~21.569~~ | ~~11.765~~ | ~~5.8824~~ |
| 6 | 68 | 30 | 2 | 46.606 | 52.474 | 0.9195 | 62.687 | 25.373 | 11.194 | 0.7463 | text range [56,75] [11,30] [2,14]

| Vertex# | SiO2 mol.% | BaO mol.% | MgO mol.% | SiO2 wt.% | BaO wt.% | MgO wt.% | O at.% | Si at.% | Ba at.% | Mg at.% |
|---|---|---|---|---|---|---|---|---|---|---|
| 1 | 75 | 23 | 2 | 55.54 | 43.47 | 0.993 | 63.64 | 27.27 | 8.364 | 0.727 |
| 2 | 75 | 11 | 14 | 66.69 | 24.96 | 8.35 | 63.64 | 27.27 | 5.091 | 5.091 |
| 3 | 75 | 11 | 14 | 66.69 | 24.96 | 8.35 | 63.64 | 27.27 | 5.091 | 5.091 |
| 4 | 56 | 30 | 14 | 39.45 | 53.93 | 6.616 | 60.94 | 21.88 | 11.72 | 5.469 |
| 5 | 56 | 30 | 14 | 39.45 | 53.93 | 6.616 | 60.94 | 21.88 | 11.72 | 5.469 |
| 6 | 68 | 30 | 2 | 46.61 | 52.47 | 0.92 | 62.69 | 25.37 | 11.19 | 0.746 |

| #3 text range | [55,65] | [5,15] | [25,35] | | | | | | |
|---|---|---|---|---|---|---|---|---|---|
| Vertex# | | | | | | | | | |
| 1 | 65 | 10 | 25 | 60.583 | 23.786 | 15.63 | 62.264 | 24.528 | 3.7736 | 9.434 |
| 2 | 65 | 5 | 30 | 66.405 | 13.036 | 20.559 | 62.264 | 24.528 | 1.8868 | 11.321 |
| 3 | 60 | 5 | 35 | 62.345 | 13.259 | 24.395 | 61.538 | 23.077 | 1.9231 | 13.462 |
| 4 | 55 | 10 | 35 | 52.886 | 24.539 | 22.575 | 60.784 | 21.569 | 3.9216 | 13.725 |
| 5 | 55 | 15 | 30 | 48.499 | 33.756 | 17.745 | 60.784 | 21.569 | 5.8824 | 11.765 |
| 6 | 60 | 15 | 25 | 52.151 | 33.273 | 14.576 | 61.538 | 23.077 | 5.7692 | 9.6154 |

| #4 text range | [57,63] | [7,13] | [27,33] | | | | | | |
|---|---|---|---|---|---|---|---|---|---|
| Vertex# | | | | | | | | | |
| 1 | 63 | 10 | 27 | 59.082 | 23.933 | 16.985 | 61.977 | 23.954 | 3.8023 | 10.266 |
| 2 | 63 | 7 | 33 | 61.165 | 17.344 | 21.491 | 61.71 | 23.42 | 2.6022 | 12.268 |
| 3 | 60 | 7 | 33 | 60 | 17.864 | 22.136 | 61.538 | 23.077 | 2.6923 | 12.692 |
| 4 | 57 | 10 | 33 | 54.464 | 24.385 | 21.151 | 61.089 | 22.179 | 3.8911 | 12.84 |
| 5 | 57 | 13 | 30 | 51.677 | 30.078 | 18.245 | 61.089 | 22.179 | 5.0584 | 11.673 |
| 6 | 60 | 13 | 27 | 53.914 | 29.812 | 16.274 | 61.538 | 23.077 | 5 | 10.385 |
| #5 $Mg_2SiO_4$ forsterite | 33.333 | 0 | 66.667 | 42.706 | 0 | 57.294 | 57.143 | 14.286 | 0 | 28.572 |
| #6 $MgSiO_3$ enstatite | 50 | 0 | 50 | 59.852 | 0 | 40.148 | 60 | 20 | 0 | 20 |

GLASS COMPOSITIONS FOR CERAMIC ELECTROLYTE ELECTROCHEMICAL CONVERSION DEVICES

BACKGROUND OF THE INVENTION

1. Field of the Invention

This invention relates to a composition of matter for use as a glassy matrix for sealing materials in gas-tight structures of solid oxide fuel cells and of related electrochemical devices and for use in making interconnects for such devices.

2. Background Art

Fuel cells have attracted interest because they can potentially operate at high efficiencies in converting chemical energy to electrical energy, since they are not subject to the Carnot cycle limitations of internal combustion engines.

One type of fuel cell that is especially appropriate for converting hydrocarbon-derived fuels to electricity is the solid oxide fuel cell (SOFC). A SOFC system includes a cathode, an electrolyte, and an anode. The cathode typically is a porous, strontium-doped lanthanum manganite (LSM) electronically-conducting ceramic; the electrolyte typically is a dense, yttria-stabilized zirconia (YSZ) oxygen ion conducting ceramic; and the anode is typically a porous, nickel-YSZ cermet. Fuel is provided to the anode and air is provided to the cathode. Because electrons cannot move through the YSZ electrolyte, those electrons can be forced to do useful electrical work in an external circuit as oxygen ions formed at the cathode move through the YSZ to react with the fuel at the anode.

An SOFC is able to use as fuels molecules that contain carbon, rather than the highly purified hydrogen required for present-day proton exchange membrane fuel cells. The SOFC-type of fuel cell typically uses a fuel that is natural gas or a synthetic fuel gas containing hydrogen, carbon monoxide, and methane, separated by the electrolyte and its seals from an oxidant such as ambient air or oxygen. With the proper anodes, a SOFC can also use octane and synthetic diesel fuels directly as vaporized. This makes the SOFC adaptable for use as an auxiliary power unit (APU) in vehicles to help meet the growing demand for on-board electrical power.

In SOFCs, hydrogen and carbon monoxide fuels, for example, react chemically with oxygen ions that have passed through the solid electrolyte to produce electrical energy, water vapor, and heat. Even with thin membranes (e.g., 10 micrometers thick) of the YSZ electrolyte, it is necessary to operate the cell at an elevated temperature to keep the internal cell resistance sufficiently low that adequate power can be produced in the external circuit. Consequently, temperatures in the operating SOFC cell may range from 500° to 1100° C. In turn, the seals which keep the fuel and oxidant gas flows separate must be able to function at those elevated temperatures.

Automotive SOFC needs differ from stationary power generation and other fuel cell applications. Due to the limited space available in a vehicle, automotive applications of fuel cells require high volumetric power densities, in addition to the high chemical-to-electrical conversion efficiency that has been established in stationary SOFCs. Just as gasoline and diesel fuels are preferred for their compact storage of great amounts of energy as room-temperature-liquid hydrocarbons, the vehicular fuel cell preferably performs its operation within only a small volume.

In planar SOFCs with high volumetric power densities, gas-tight seals must be formed along the edges of each cell, between each successive cell in a stack, and at the respective gas flow manifolds. An effective sealant creates a gas-tight seal to the cell and stack components, while holding the cell and stack together when exposed to the high temperatures and the reducing and oxidizing gases present in such cells. To realize such planar designs for automotive use, a need remains to find sealants whose performance can withstand the elevated temperatures with both reducing and oxidizing gases in the operating environment of a SOFC, and with the chemical potential gradients that are formed in making the seal between the two gas flows.

In tubular SOFCs for large-scale power plants, at present, seals are made of polymeric elastomer materials, which must be kept at relatively low temperatures (below 150° C.). Consequently, portions of the ionic-conducting tubes are intentionally left electrically inactive to allow for a temperature transition zone to reach down to the temperatures required by the compliant low temperature seals. Not only does this approach result in lower volumetric power densities, but also such added tube length decreases the ability to accommodate the vibrations that are encountered in typical automotive use. High temperature-capable sealing systems can contribute to the desired high power volumetric densities (and also to a lowered mass) by eliminating much of the non-electrically active tube length. Such shortening also will decrease the internal electrical resistance that is associated with the transition lengths needed to protect seals made with existing technology, which can only be used at lower temperatures.

Thus, both planar and tubular designs can benefit in power density from designs which incorporate well-suited high temperature sealing materials.

The benefits to high power density from sealing glasses, as described above, also extend to related electrochemical devices, such as steam reformers and $NO_x$-removing electro catalyst systems. If a $NO_x$ reforming system is to be used on a vehicle, it should be of low weight and compact size, so that it can benefit from a high temperature sealant that produces high power density in a SOFC. Differences exist from those of the SOFC in each case. In the case of the $NO_x$ reformer, electrical power is applied to the cell by thermo-electric conversion of a temperature gradient from exhaust heat to ambient or by a current imposed from an external circuit, rather than by electricity being produced from the conversion of chemical energy to electrical energy, as in a SOFC. For non-vehicular applications of the fuel cell and $NO_x$ devices, and others such as the steam reformer and oxygen electrolysis, it may be desired for other reasons to have a more compact unit operation: there may be only limited retrofit space in a modularized chemical production plant, or there may be a need for portability, as in an oxygen generating medical cart or remote battery charger. In each instance, the sealing material affects whether the design achieves a high power density within applicable space constraints.

A second difference in SOFC requirements for automotive applications is the need for highly efficient conversion to electrical energy in a single or minimum number of processing steps. In contrast, SOFCs intended for use in residential fuel cell co-generation systems can tolerate allowing fuel gas residues (which have not been converted to electricity) to escape from the edges of radial flow plates or the ends of incompletely sealed tube joints, because in such co-generation systems the lost electrical conversion can be used beneficially to generate more of the co-generated heat.

Leaky, pressed powder seals such as the talc seals in spark plug insulator compression seals may be suitable for stationary, residential-type co-generation systems. Such seals are less appropriate for automotive use because of their lower efficiency in converting chemical energy to electrical energy.

In view of the automotive and portable power demands for fuel cells operating directly with hydrocarbon fuels, high power density, and high chemical-to-electrical efficiency, the need arises to make compositions for gas-impermeable seals that are suitable for use at the high operating temperatures of SOFCs and their associated structures. Ideally, such seals would exhibit nearly the particular, high thermal expansion coefficient (CTE) that ensures dimensional compatibility among the yttria-stabilized zirconia (YSZ) in the electrolyte, the electrodes, the current collectors, and the structural members.

The prior art includes a publication by N. Lahl, et al., "Aluminosilicate Glass Ceramics As Sealant In SOFC Stacks," SOLID OXIDE FUEL CELLS VI, S. C. Singhal, et al., editors, PV 99-19, p. 1057–66, THE ELECTROCHEMICAL SOCIETY PROCEEDINGS SERIES, Pennington, N.J. (1999). That publication is incorporated herein by reference. It discloses a glass composition identified as "BAS" that has 45 mol percent BaO; 45% $SiO_2$; 5% $Al_2O_3$; and 5% $B_2O_3$, with no MgO present. It is noted that the high BaO content (45%) is needed to attain a relatively high coefficient of thermal expansion. As a result of having so much of the heavy alkaline earth oxide (BaO) in the composition, the estimated thermal conductivity is lowered and environmental stability toward $H_2O$ and $CO_2$ is lowered. Although the material composition is alkali oxide-free, the composition is not boric acid-free, because it includes 5% $B_2O_3$. The composition is therefore subject to concerns about vaporizing, depositing, and insulating to reduce performance and shorten useful life.

The Lahl. et al. reference discloses that "Glass ceramics are formed by controlled crystallization from glass . . . " Id.. p. 1057. Glass ceramics are contrasted with remaining glasses in the next sentence: "As compared to glasses . . . [glass ceramics] show superior mechanical properties . . . " Id.

Such difficulties with seals have possibly led to decreased interest in planar cells. The high power densities of planar designs are not as critically needed for the power plant and residential heating applications as they are for vehicular applications.

Related disclosures in the art of preparing SOFCs include U.S. Pat. Nos. 6,099,985 (issued Aug. 8, 2000); and 4,827,606 (issued May 9, 1989), the disclosures of which are also incorporated herein by reference.

SUMMARY OF THE INVENTION

The present invention discloses a first glass matrix composition consisting essentially by mol percent of about 55<$SiO_2$<75; 5<BaO<30; and 2<MgO<22 for use as a matrix of composite materials.

More particularly, the invention also includes a second glass matrix composition (which lies entirely within the first glass composition range), consisting essentially by mol percent of about 60<$SiO_2$<75; 15<BaO<30; and 7.5<MgO<12.5.

Also disclosed is a method of making a glass matrix-ceramic particulate third composite for sealing electrochemical structures. The third composite comprises a physical admixture of finely divided ceramic (e.g., $Mg_2SiO_4$) particulates to the above first and second matrix glasses, to reach an overall composition by mol percent of about 55<$SiO_2$<65; 5<BaO<15; and 25<MgO<35, while keeping the temperature below 1500° C. in subsequent processing.

The invention also includes a method of making a glass matrix-ceramic particulate fourth composition useful for sealing by physical admixture of $Mg_2SiO_4$ to the first and second matrix glasses, to reach an overall composition of about 57<$SiO_2$<63; 7<BaO<13; and 27<MgO<33, while keeping the temperature below 1500° C. in subsequent processing.

The method of making the first and second matrix glasses comprises the steps of: (a) providing as starting materials: silica, barium carbonate, and magnesia; (b) firing the starting materials to form fired materials in a crucible of platinum or high alumina at or above 1500° C.; and (c) quenching the fired materials in a quenching medium.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1A:
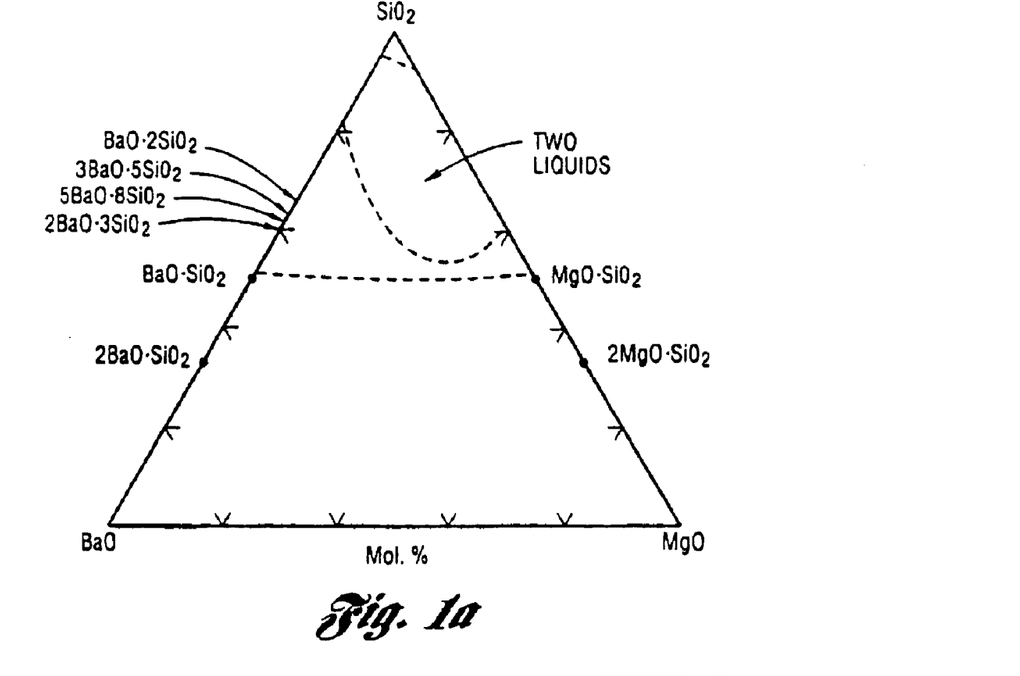
FIGS. 1a–1b represent ternary phase diagrams of the BaO—MgO—$SiO_2$ system illustrating the boundaries of the first and second matrix glass compositions; the overall boundaries of the third and fourth compositions; and a fifth composition, including $Mg_2SiO_4$, which is a preferred particulate ceramic physical admixture additive.
Figure 1B:
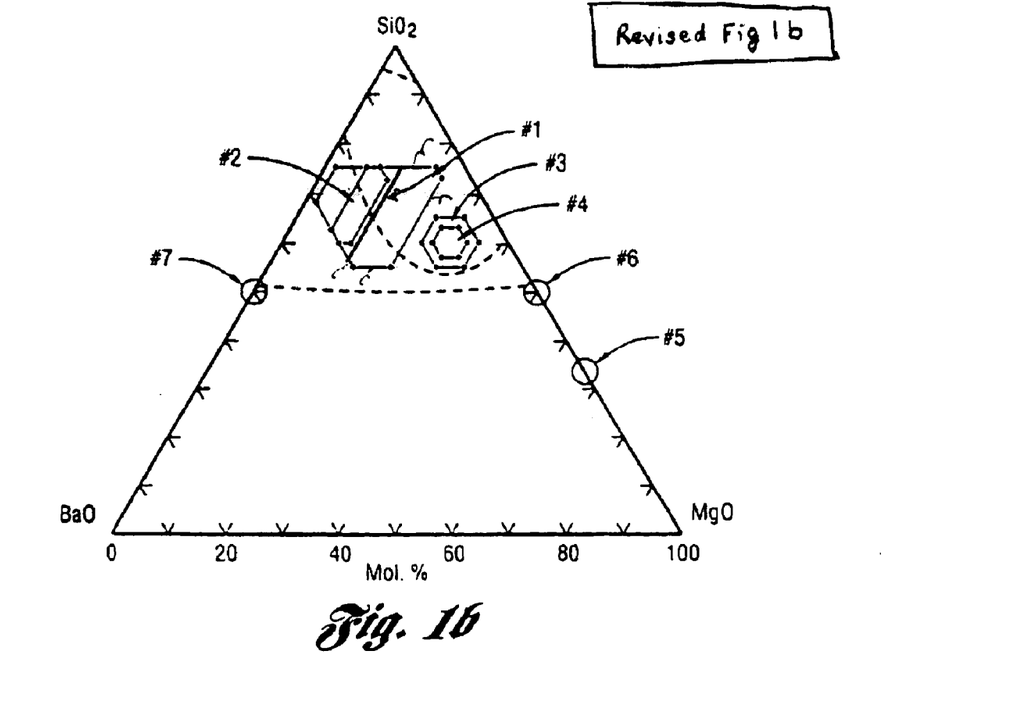

Referring first to FIGS. 1a–1b, the present invention discloses a first glass matrix composition consisting essentially by mol percent of about 55<$SiO_2$<75; 5<BaO<30; and 2<MgO<22 for use as a matrix of composite materials. All percentages disclosed herein are expressed as mol percent. More specifically, the invention includes a second glass matrix composition consisting essentially of 60<$SiO_2$<75; 15<BaO<30; and 7.5<MgO<12.5.

Figure 2A:
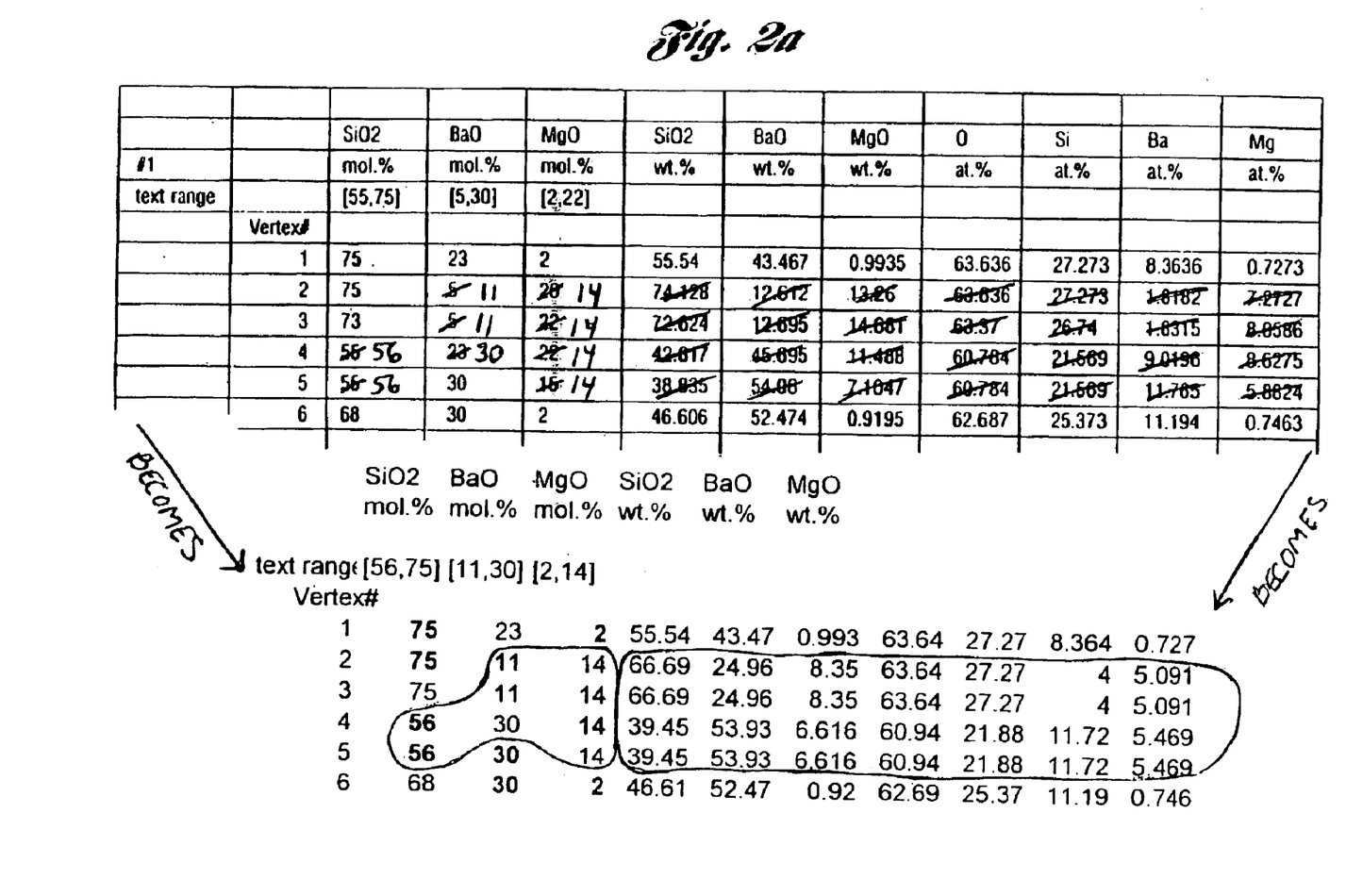
FIGS. 2a–2b tabulate various compositions in the BaO—MgO—$SiO_2$ system with their equivalent compositions expressed as mol percents, as weight percents, and as atom percents.
Figure 2B:
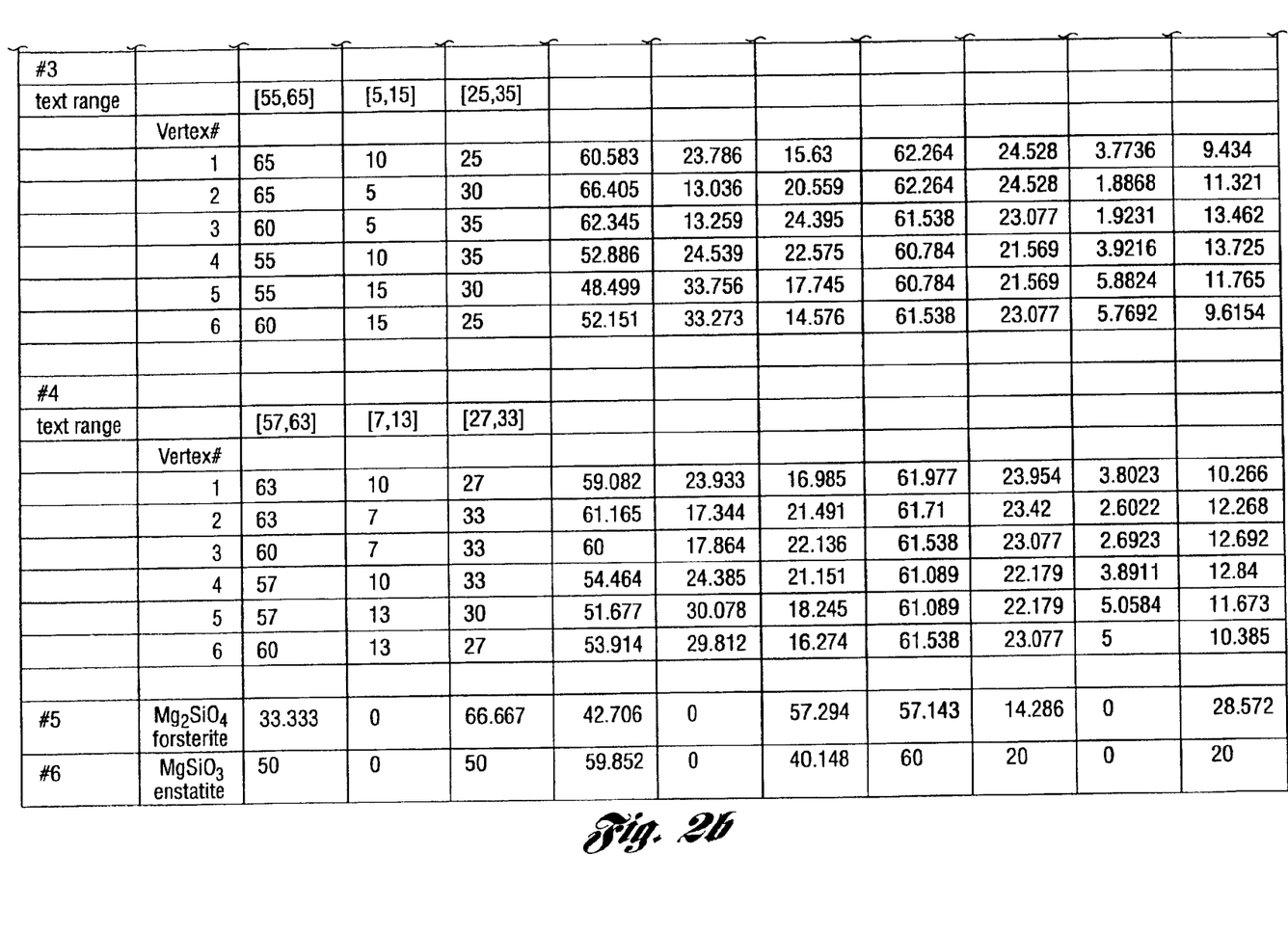

The equivalent weight percent and atomic percent conversions for several particular chemistries are provided in FIG. 2.

The invention also includes a method of making a matrix glass-ceramic particulate composite. The method of making the above first and second matrix glasses comprises the steps of: (a) providing as starting materials: silica, barium carbonate, and magnesia; (b) firing the starting materials to form fired materials in a crucible of platinum or high alumina at or above 1500° C.; and (c) quenching the fired materials in a quenching medium.

When the first or second matrix glass composition is physically mixed with certain finely divided ceramic powders, such as $Mg_2SiO_4$, a sealing glass with an overall third or fourth chemical composition is formed which seals to yttria-stabilized zirconia upon firing at about 1150°–1200° C. Fugitive organic materials which are subsequently burned off may be useful as a low viscosity vehicle and binder for wicking the powder admixture into assembly joint crevices and for use in the screen-printing of thick film patterned deposits of the sealing composite material and patterning a specific gas inlet/outlet manifolding design.

When the first or second matrix glass composition is mixed with a finely divided metal, such as silver or a ferritic stainless steel, and then fired at the sealing temperature, a cell-to-cell interconnector or current collector material is formed. As a current collector or distributor, the matrix glass-metal particulate composite is printed onto electrode surfaces in a dendritic or helical pattern to minimize resistance in-plane or along a tube length. Especially suited for use as a current collector are composites with two sizes of the matrix glass particles to produce, upon firing, a necklace pattern of the conductor (as viewed in a polished cross-section) which produces continuous paths for the metallically-conducting phase (here the metal of silver or ferritic stainless steel) with low fractions of additive of the metallic-conducting phase. For ferritic stainless steel, a protective atmosphere must be provided during sealing near 1200° C.

If the first and second matrix glasses are prepared by glass melting, the preferred composition lies within the respective non-equilateral hexagonal areas depicted in FIG. 1b.

Thus, as a seal, the disclosed first and second matrix glass compositions, when combined with fine $Mg_2SiO_4$-ceramic particulates to make an overall chemistry of the third or fourth composites, are used to fill joints that require effective sealing in an electrochemical device operating environment and to make sequential layered patterns for gas manifolds.

The disclosed four compositions have no alkali oxide content, and thus differ from many typical previously known sealing glass compositions. As a result, the sealing glasses of the third and fourth composition are able to tolerate extended operation at temperatures above 850° C., and are of a sufficiently high expansion coefficient to match that of YSZ.

The disclosed four compositions are of lower BaO content than the BAS composition of Lahl, et al., which is projected onto the phase diagram of FIG. 1b at point #6. As a result, the disclosed composition has better estimated thermal conductivity, can be fabricated at a lower cost of raw materials, and has a higher tolerance for high temperature $H_2O$ and $CO_2$ due to a reduced content of the alkaline earth oxide, barium oxide.

Additionally, in all four of the compositions, freedom from any $B_2O_3$ content avoids contamination and avoids imbuing insulating properties to electrically-active parts of the fuel cells.

Further, the third and fourth composition composites can be produced by mixing together separately-made phases of the inventive glassy matrix phase with one or more finely divided ceramic or metal phases. The encompassed third and fourth compositions provide benefits of a first or second matrix glass of the composite without inconsistencies inherent in the alternative method of melting a composition of matter of the overall third or fourth chemistry above 1500° C., which produce phase development sometimes to $MgSiO_3$ and sometimes to $Mg_2SiO_4$ (or other).

The coexistence of the matrix glass with the particulate phase during the high temperature glassmaking also affects the particle size of the particulate-phase. In particular, the high temperature allows coarsening of the particulate phase to occur to a size significantly greater than 10 micrometers. Although this coarsening can be minimized by shortening the time at the highest temperature in glassmaking, one still needs to provide time for chemical homogenization of the matrix glass. Milling of the chilled glass appears to comminute the softer matrix glass more than the particulate-phase particles and so is relatively ineffective in making the particulate-phase particles smaller. The net result is that the relatively large particulate-phase particles in such a sealant lead to sealed electrochemical assemblies with large residual stresses in the matrix sealing glass. The residual stresses add to any expansion mismatch stress or externally applied load, and consequently make the seal appear to be mechanically weaker. Also, the larger particles allow faster greater gravitational separation during the semi-molten stage of the sealing cycle, leading to greater non-uniformities of expansion coefficient of the less uniform glass composite seals.

The present invention provides a robust means to make otherwise difficult boron- and alkali oxide-free glass compositions for seals and current collectors that are intended for use at high operating temperatures within solid oxide fuel cells and their associated structures. The invention has the characteristics of high thermal expansion (to match the stabilized zirconia in the electrolyte and in the electrodes), a relatively low alkaline earth oxide content (to provide a higher thermal conductivity and also environmental stability against hydration and carbonation), and chemical compatibility with the electrolyte under both reducing and oxidizing conditions (to provide long life with high performance).

The disclosed compositions avoid difficulties in conventional approaches to sealing glasses. For example, with alkali oxide-containing glasses, reactions occur with chromium in interconnects, in addition to a substantial mismatch in coefficients of thermal expansion. If boron is present, glass-making temperatures are reduced, with the consequence that the coefficient of thermal expansion is low. Additionally, boric acid volatilizes, thereby insulating parts of the solid oxide fuel cell. Further, when melting the filler and the matrix, a very narrow range of temperature for formation of the filler phase leads to processing inconsistencies in phase development, as well as coarser sizing.

The fine powder of the disclosed matrix glass compositions may also be prepared by sol-gel precursors to the oxides. In this case, nanoscale mixing allows the reaction and formation of the matrix glass at a temperature as low as that used in sealing. Alternatively, the matrix glass compositions can be prepared by traditional glass melting, followed by fritting into a fine powder.

Referring again to FIGS. 1a–b, the inserted equilateral hexagons #3 and #4 depict the boundaries of the third and fourth overall batch compositions. The area marked at #5 in FIG. 1b depicts the composition $Mg_2SiO_4$. In like manner, the marker at #6 depicts the composition $MgSiO_3$. The point marked at #7 depicts the $BaO$—$SiO_2$ ratio of the BaO—$Al_2O_3$—$SiO_2$ (BAS) chemistry of the prior art Lahl, et al. composition which is projected onto the $BaO$—$SiO_2$ line of the BaO—MgO—$SiO_2$ (BMS) diagram of FIG. 1b.

FIGS. 2a–2b provide a table of converted equivalents of the compositions depicted at the vertices of the hexagonal areas of FIG. 1, expressed in mol percents as oxides, expressed in weight percents as oxides, and expressed in atom percents as elements.

Figure 3:
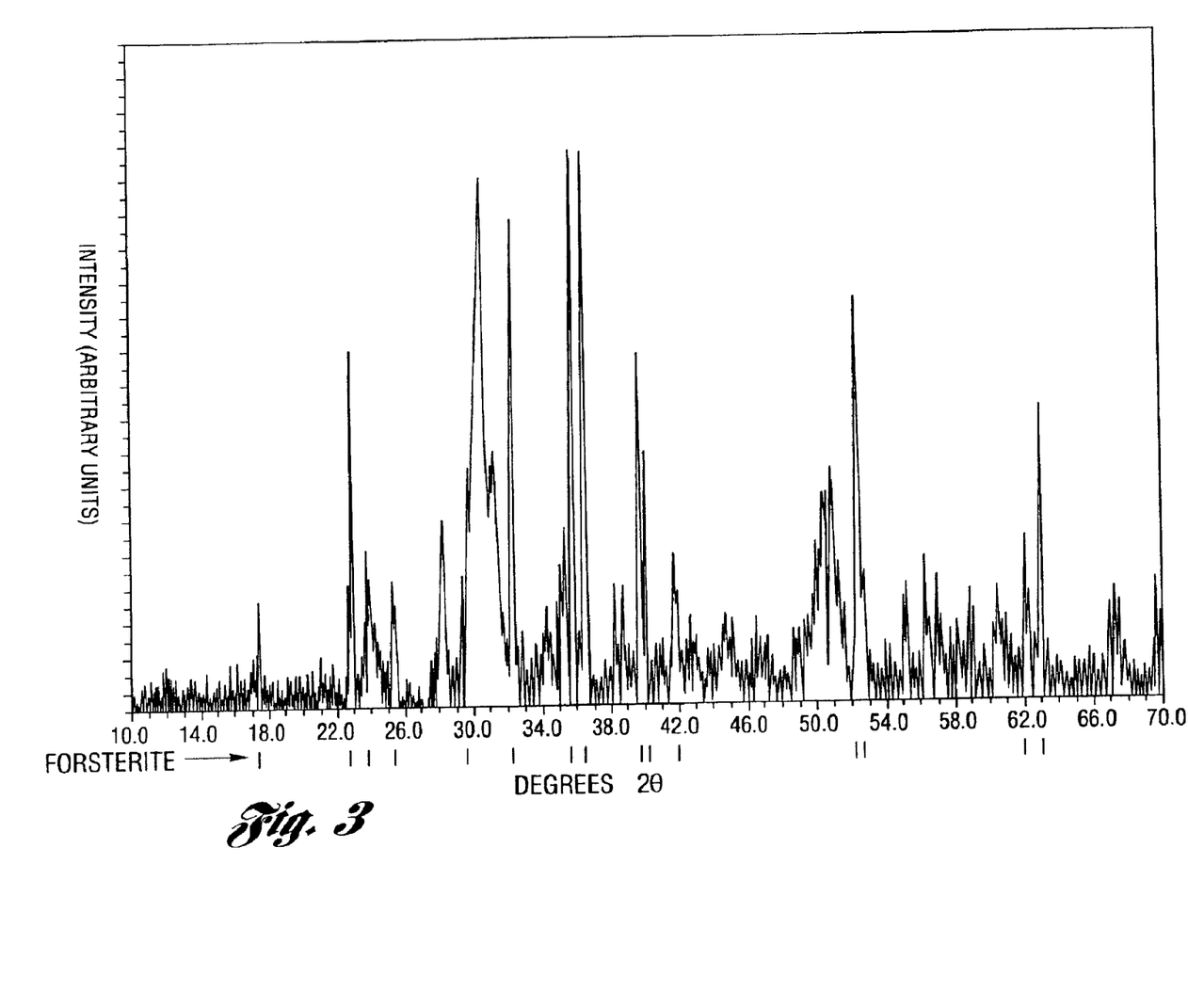
FIG. 3 is an x-ray diffraction spectrum of a composite of overall third composition.

FIG. 3 depicts an x-ray diffraction spectrum of a composite of the third composition. The presence of the preferred, $Mg_2SiO_4$ particulate phase is indicated by the peaks at about 17.4, 23.0, 32.3, 35.7, 36.6, 39.7, 40.1, and 52.50 two theta (as observed with copper K alpha radiation). These lines correspond to the $Mg_2SiO_4$ phase with the crystal structure of forsterite (mineralogical name) and JCPDS No. 34-0189.

Figure 4:
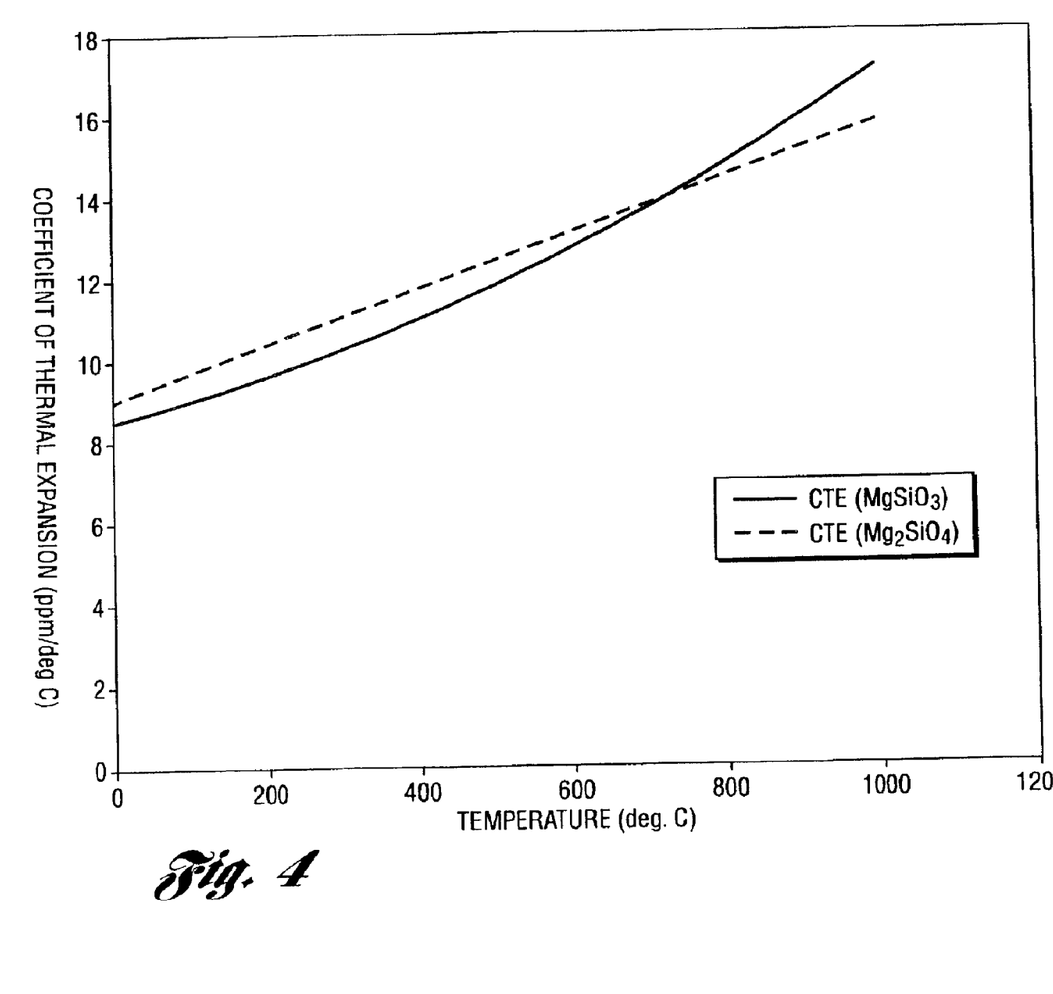
FIG. 4 is a plot of thermal expansion coefficients, comparing the preferred forsterite $Mg_2SiO_4$ with the less uniform expansion, adjacent phase of $MgSiO_3$, which is denoted by the mineralogical name, proto-enstatite.

FIG. 4 plots thermal expansion coefficients against temperature, comparing the preferred forsterite $Mg_2SiO_4$ against the less uniform expansion, adjacent phase of $MgSiO_3$, (mineralogical name: proto-enstatite) which is located on FIG. 1b at location #6. The more uniform coefficient of thermal expansion of $Mg_2SiO_4$ than $MgSiO_3$ allows $Mg_2SiO_4$, but not $MgSiO_3$, to produce a matrix glass-particulate ceramic composite that matches the thermal expansion of yttria-stabilized zirconia with a lower barium content in the matrix glass.

Thus, the disclosed invention solves a need for a satisfactory, high temperature sealing technology which will meet automotive and other applications in which a high volumetric power density is desired.

EXAMPLES

Example 1 involves the experimentally-determined sealing performance of a sealant within the third overall composition and the matrix within the first glass composition and with forsterite (#5 composition on FIG. 1b) as the particulate-phase.

An overall batch composition of approximately 61 mol. % $SiO_2$, 9 mol. % BaO and 30 mol. % MgO (corresponding to a point within the fourth (#4) overall composition) was prepared by glass melting between 1540 and 1570° C. (The batch composition is equivalent to about 51.25 weight percent of $Mg_2SiO_4$ and about 48.75 weight percent of a glass composition at 72 mol. $SiO_2$, 18 mol. % BaO and 10 mol. % MgO, which is within the fourth glass composition.) The batch for glass-melting was prepared from precursors of −325 mesh, silica, 99.6%, No. 34,289-0, Sigma-Aldrich; barium carbonate, 99+%, No. 23,710-8, Sigma-Aldrich; and magnesium oxide, −325 mesh, 99+%, No. 23,710-8, Sigma-Aldrich. By changing the temperature of glass melting, a particulate forsterite phase was produced.

As inferred from SEM-EDX of seals, the matrix glass composition was in the region of the first matrix composition range. The particulate phase was in the fifth composition (#5) of FIG. 1c, at $Mg_2SiO_4$. The presence of the forsterite phase was confirmed by x-ray diffraction, as shown in FIG. 3.

The quenched glass was milled to a particle size finer than 20 micrometer, and 2% by weight Butvar(R) 98 binder was added with an anhydrous alcohol vehicle to make a paint-like slurry. This slurry was applied to each end of two matching cylinders of stabilized zirconia, each of outer diameter 1 cm. The slurry was allowed to dry and then was heated to 1180° C. under light compression to form a ring seal. The assembly was then furnace cooled. The seal was subjected to a $N_2$/4% $H_2$ simulated fuel flowing inside the joined cylinders and laboratory air at the outside circumference of the ring seal at 850° C. for 4 days. After cooling to room temperature, helium leak testing showed the seal remained gas-impermeable. This impermeability is evidence of achieving 1) a close match of coefficient of thermal expansion and the stabilized zirconia, 2) tolerance of both oxidizing and reducing atmospheres and the gradient in the seal between those two, and 3) sufficient chemical compatibility with stabilized zirconia.

Example 2 involves the preparation and use of the inventive glass composition in sealing a SOFC structure. The matrix glass is prepared from fine silica, barium carbonate and magnesium oxide as in Example 1, but with the composition of 67 mol. % silica, 22 mol. % barium oxide, and 11 mol % magnesium oxide. This matrix glass is melted at 1555° C., quenched, milled to 5 micrometer particle size. Separately, $Mg_2SiO_4$ is milled to 2 micrometer particle size. The batch composition is prepared to 51.25 weight percent of $Mg_2SiO_4$ and 48.75 weight percent of the matrix glass composition at 72 mol. % $SiO_2$, 18 mol. % BaO and 10 mol. % MgO, which is within the fourth glass composition. Because the same chemistry and phases are present after sealing as in Example 1, the performance is the same as for the glass of Example 1: it is stable under reducing and oxidizing environments and has a thermal expansion match to stabilized zirconia. The seal of this example is preferred because it has finer, more uniform particles.

Example 3 involves the use of the sealing composition in planar cells with screen printing. As in Example 2, powders are prepared of the separate matrix and forsterite. The materials are separately finely milled. A physical admixture is then made in ethyl cellulose with Butvar 98 (R) binder, instead of anhydrous alcohol, to promote screen printing. The paste is printed in edge and manifold patterns onto a dense electrolyte layer (which itself is supported by a porous anode substrate) to make the seals that separate the gas flows in planar cells. The printed patterns are aligned, stacked, heated to the sealing temperature of 1180° C. under light compression, and cooled. Because of close CTE match and higher thermal conductivity than high BaO sealants, this assembly with the inventive sealing glass allows larger planar sizes and faster heating rates than with more poorly matching CTE sealants with lower thermal conductivity.

Example 4 involves a small tubular design with a plurality of electrolyte supported tubes into a header-plate for the fuel entry feeding system. In the design with a plurality of 2–3 mm outside diameter, electrolyte tubes as presented in a publication by T. Alston, K. Kendall, M. Palin, M. Prica, and P. Windibank, entitled "A 1000-cell SOFC Reactor for Domestic Cogeneration," published in the Journal of Power Sources, volume 71, pp. 271 through 278, 1998, there is described a transition zone of lengths of the parallel tubes which serves as a temperature transition zone to permit the use of a lower temperature seal. In this stationary SOFC, the long cantilevered tubes are not subjected to vibration. In this comparative example, with the use of the inventive sealant to join the electrolyte tubes to the header-plate at elevated temperature, the length of tubes used to transition to a lower temperature seal can be active, instead of being an electrochemically inactive zone. Consequently, the use of the high temperature sealant provides greater power density than that of the publication. Furthermore, the shorter overall tube length with the inventive material provides for better vibration tolerance, in particular, due to a higher resonance frequency for shorter cantilevered tube length.

Example 5 involves a radial flow plate SOFC design with fuel and oxidizer feeding between alternative plates from patterned openings or seals at or near the center for the alternating flows. With the inventive sealant, the center can be kept at the operating temperature. This example shows how the sealant can be useful for stationary technologies without need for highest chemical-to-electrical efficiencies.

Example 6 involves an application for a $NO_x$ reformer. An electrolyte with $CeO_{2-x}$ fluorite, with an adjusted fraction of magnesium silicate phase, compensates for the different expansion coefficients, while providing light weight needed for mobile structures.

Example 7 involves steam electrolyzer, with platinum electrodes on YSZ. By use of the high temperature sealant, the unit is more compact and lighter in weight.

Example 8 involves silver as a current collecting interconnect. Two sizes are used for the matrix glass particles, to produce a connected necklace structure with a minimum of silver.

Example 9 is similar to Example 8, but with gold as the crystalline particulate. Other alloys which are noble to air at elevated temperatures Ag—Pd, are suited, too.

Example 10 resembles in Example 8, but has a powder of irregularly shaped ferritic stainless steel alloy. In this case, a protective atmosphere is used during glass sealing, together with a higher volume fraction than for the oxide-free metals.

Example 11 describes alternate ways to make the chemical composition of the matrix material. From sol-gel processing, nanoscale homogenous mixtures of the matrix glass can be formed at temperatures below the sealing temperature to eliminate the high temperature glass-making stage and the separate making of the matrix glass. In particular, fine $Mg_2SiO_4$ can be added to the sol-gel precursors, which can serve as the vehicle for application to the electrolyte. This has added cost raw materials than in conventional glass-making, and has larger shrinkages in sealing. The technique is representative of a large number of ways to make the matrix glass mixtures from other precursors for use in the physical admixture.

While the best mode and examples for carrying out the invention have been described in detail, those familiar with the art to which this invention relates will recognize various alternative designs and embodiments for practicing the invention as defined by the following claims.

What is claimed:

1. A glass matrix composition for a high operating temperature sealed assembly in ceramic electrolyte electrochemical conversion devices, consisting essentially by mol percent of:

$56<SiO_2<75$;

$11<BaO<30$; and $2<MgO<14$, said composition having the characteristics of being chemically resistant to oxidizing and reducing conditions encountered in sealing solid oxide fuel cells.

2. A glass matrix composition for a high operating temperature sealed assembly in ceramic electrolyte electrochemical conversion devices, consisting essentially by mol percent of:

$60<SiO_2<75$;

$15<BaO<20$; and $7.5<MgO<12.5$.

3. A glass matrix-ceramic particulate composite consisting essentially by mol percent overall of about:

$55<SiO_2<65$;

$5<BaO<15$;

$25<MgO<35$; and a forsterite phase consisting of $Mg_2SiO_4$.

4. The glass matrix-ceramic particulate composite of claim 3, consisting essentially by mol percent overall of about:

$57<SiO_2<63$;

$7<BaO<13$;

$27<MgO<33$; and a forsterite phase consisting of $Mg_2SiO_4$.

5. The glass matrix-ceramic particulate composite of claim 3, consisting essentially by mol percent overall of:

$55<SiO_2<65$;

$5<(BaO+SrO)<15$; and $25<MgO<35$.

* * * * *